(12) United States Patent
Sheydayi

(10) Patent No.: US 12,111,457 B2
(45) Date of Patent: Oct. 8, 2024

(54) INTEGRATED MICRO-DISPLAY MODULE WITH FLEX CIRCUITRY

(71) Applicant: L3Harris Technologies, Inc., Melbourne, FL (US)

(72) Inventor: Alexei Sheydayi, Gilbert, AZ (US)

(73) Assignee: L3Harris Technologies, Inc., Melbourne, FL (US)

( * ) Notice: Subject to any disclaimer, the term of this patent is extended or adjusted under 35 U.S.C. 154(b) by 233 days.

(21) Appl. No.: 17/678,691

(22) Filed: Feb. 23, 2022

(65) Prior Publication Data
US 2023/0266578 A1 Aug. 24, 2023

(51) Int. Cl.
G02B 23/12 (2006.01)
G01J 1/44 (2006.01)
G08B 21/18 (2006.01)

(52) U.S. Cl.
CPC .............. *G02B 23/12* (2013.01); *G01J 1/44* (2013.01); *G08B 21/182* (2013.01)

(58) Field of Classification Search
None
See application file for complete search history.

(56) References Cited

U.S. PATENT DOCUMENTS

| 5,943,174 | A | 8/1999 | Bryant et al. | |
| 11,054,629 | B1 | 7/2021 | Sheydayi et al. | |
| 2012/0097741 | A1* | 4/2012 | Karcher | F41G 1/473 |
| | | | | 235/404 |

FOREIGN PATENT DOCUMENTS

EP 3851898 A1 7/2021

OTHER PUBLICATIONS

European Search Report received for EP Patent Application No. 23156008.7, mailed on Jul. 25, 2023, 8 pages.
European Search Report received for EP Patent Application No. 23219854.9, mailed on Apr. 24, 2024, 6 pages.

* cited by examiner

*Primary Examiner* — Nicholas J Lee
(74) *Attorney, Agent, or Firm* — Workman Nydegger

(57) ABSTRACT

Aspects of the present disclosure relate generally to night-vision systems and more specifically to an integrated micro-display module with a flex circuit. One example illustrated herein includes a method of upgrading a night-vision system. The method may include attaching a flex circuit to an intensifier module, in which the flex circuit includes one or more light detectors and extending beyond a leading edge of the intensifier module. The method may include inserting the intensifier module into a housing and folding the flex circuit to expose the one or more light detectors. The method may further include optically coupling a display unit to an output side of an intensifier module of the night vision system. The display unit may be configured to display graphical content in a field of view together with night-vision images from an output of the intensifier module of the night-vision system.

20 Claims, 12 Drawing Sheets

INTEGRATED MICRO-DISPLAY MODULE WITH FLEX CIRCUITRY

BACKGROUND

Night-vision systems or devices are electronic systems which assist a user to see in darkened or low-light environments. Night-vision technologies directed to a capability of night-vision systems to provide an increased visibility in darkened or low-light environments have not experienced a period of rapid growth for a significant length of time. Therefore, there may exist night-vision systems or devices which have been in use for a significant length of time, but which meet a night-vision capability threshold such that the systems of devices are suitable for perceived needs of many users. Accordingly, such night-vision systems or devices may remain in use due to a high cost of replacement.

However, ancillary functions associated with night-vision systems continue to advance at a rapid pace such that ancillary functionality of existing night-vision systems is nonexistent, obsolete, or otherwise less than state-of-the-art. Such ancillary functions may include the ability to overlay additional images on a night-vision display output to a user (e.g., a heads-up display (HUD) which provides additional information to a user). Accordingly, there are opportunities to provide methods or techniques for updating existing night-vision systems such that they are able to use modern or state-of-the-art ancillary functionality.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One example illustrated herein includes a method of upgrading a night-vision system. The method may include attaching a flex circuit to an intensifier module, in which the flex circuit includes one or more light detectors and extends beyond a leading edge of the intensifier module. The method may include inserting the intensifier module into a housing and folding the flex circuit to expose the one or more light detectors. The method may further include optically coupling a display unit to an output side of an intensifier module of the night vision system. The display unit may be configured to display graphical content in a field of view together with night-vision images from an output of the intensifier module of the night-vision system.

Another example illustrated herein includes a modified night-vision system. The night-vision system may include an intensifier module configured to intensify received light input into the intensifier module. The intensifier module may have an input side configured to receive photons of the received light and an output side configured to output intensified light resulting from the received light. The night-vision system may include a flex circuit attached to the intensifier module, the flex circuit including one or more light detectors and extending beyond a leading edge of the intensifier module. The night-vision system may include a display unit proximate the output side of the intensifier module, the display unit configured to output graphical content. The night-vision system may include a beam combiner optically coupled to the display unit and the output side of the intensifier module and configured to combine the intensifier light and graphical content. The night-vision system may include an eyepiece optically coupled to the beam combiner and configured to receive the combined intensified light and graphical content and to provide the combined intensified light and graphical content to a user. The night-vision system may be modified to allow for the display unit and beam combiner to be added to the night-vision system.

Another example may include a method of using a modified night-vision system. The method may include receiving input light at an input side of an intensifier module and intensifying the received light input into the intensifier module. The method may include outputting, at an output side of the intensifier module, the intensified light resulting from the received input light. The method may include powering a display unit using a flex circuit attached to the intensifier module and displaying graphical content at the display unit proximate the output side of the intensifier module. The graphical content may include one or more indicators routed via the flex circuit and the display unit may be added to the modified night-vision system that has been modified to allow of the display unit to be added. The method may include combining the intensified light and graphical content and providing the combined intensified light and graphical content to an eyepiece to provide the combined intensified light and graphical content to a user.

Additional features and advantages may be described herein or may be learned by the practice of the teachings herein. Features and advantages of the present disclosure may be realized and obtained by means of the instruments and combinations pointed out in the appended claims. Features of the present disclosure will become apparent from the description herein and the appended claims or may be learned by the practice of the teachings set forth herein.

This Summary is provided to introduce a selection of concepts in a simplified form which are further described in the Detailed Description included herein. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
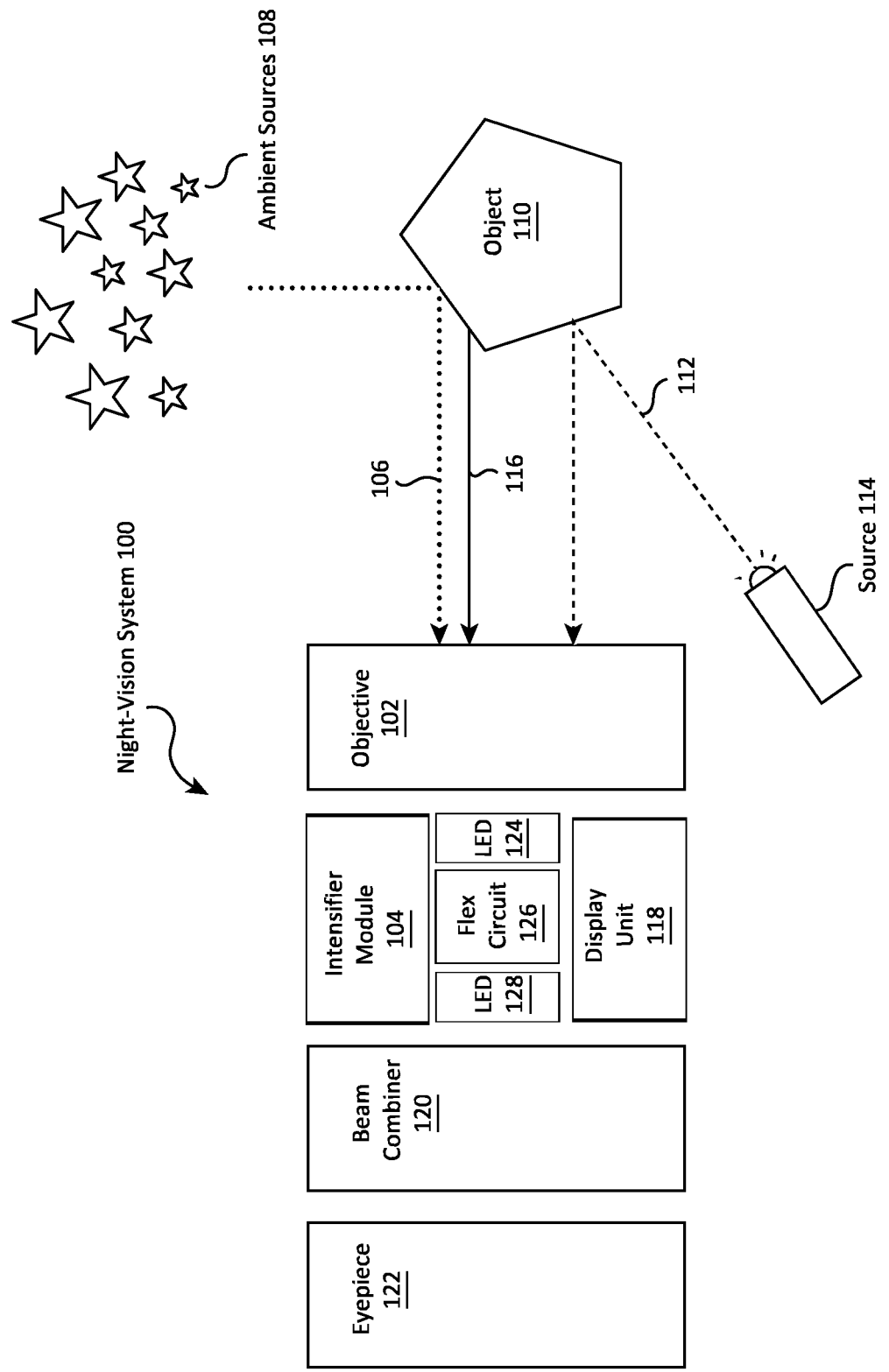
FIG. 1 illustrates a block diagram of a night-vision system.

Night-vision systems or devices are electronic systems which assist a user to see in darkened or low-light environments. Some night-vision systems may function such that individuals other than a user of the night-vision system are not made aware that a night-vision system is in use. In some examples, rather than using a flashlight which emits light in a visible spectrum (e.g., such that the light is quickly detectable), night-vision systems may use naturally occurring illumination outside of the visible spectrum and convert associated emissions or reflections to the visible spectrum and provide output to a user. For example, some night-vision systems may measure infrared thermal energy and convert that infrared thermal energy in a visual image viewable by a user. In some examples, the night-vision system may use infrared thermal energy emitted by objects being viewed by the user (e.g., without providing any additional illumination). Additionally, or alternatively, some night-vision systems may emit infrared light that is reflected off objects such that the reflected light is detected by the night-vision system. Night-vision systems which provide illumination may use light which is outside of the visible spectrum such that the light is not readily detectable.

In some examples, night-vision systems may intensify faint existing illumination (e.g., light emitted from stars, artificial lights (e.g., building lights), or other faint lights reflected off of objects) to provide visible output to a user. For example, a night-vision system may detect existing illumination and use an intensifier module to amplify light photons reflected into the night-vision system such that the night-vision system may be able to display a more visible representation of objects in an environment (e.g., without providing any additional illumination).

Night-vision technologies directed to a capability of night-vision systems to provide an increased visibility in darkened or low-light environments have not experienced a period of rapid growth for a significant length of time. Therefore, there may exist numerous night-vision systems or devices which have been in use for a significant length of time, but which meet a night-vision capability threshold such that the systems of such devices are suitable for perceived needs of many users. Accordingly, such night-vision systems or devices may remain in use due to their continued suitability for user needs in addition to a high cost of replacement.

However, ancillary functions associated with night-vision systems continue to advance at a rapid pace such that ancillary functionality of existing night-vision systems is nonexistent, obsolete, or otherwise less than state-of-the-art. Accordingly, it may be beneficial to update or upgrade existing night-vision systems such that they are able to use modern or state-of-the-art ancillary functionality.

Such ancillary functions may include, for example, the ability to overlay additional images on a night-vision display output to a user (e.g., a heads-up display (HUD) which provides additional information to a user. In some examples, such information may include a navigational heading, the speed at which the user is moving, coordinates (e.g., as provided by a Global Navigation Satellite Service (GNSS)), communication messages (e.g., email, Short Message Service (SMS) messages, etc.), timing information, vital signs of the user such as heart rate or respiration rate, indicators of whether an object is friendly or adversarial, battery or power levels of the night-vision system or other devices, weather conditions, contact information, audio information, etc.

In some cases, adding such functionality to existing night-vision systems may be difficult or expensive. For example, it may be important to avoid changes to a form factor of a night-vision system as such changes may represent a significant expense due to constraints of other enclosures or configurations. In some cases, there may also be limited space within an existing device, making it difficult to fit additional components (e.g., display units) in an existing housing.

Various aspects of the present disclosure are generally directed to techniques, methods, and systems associated with upgrading existing night-vision systems with ancillary functionality, such as display units. In some embodiments, existing components may be removed or rendered inoperable as part of adding the display units. For example, in some embodiments, light pipes used to direct light indicating low battery conditions, use of night vision IR illumination, or other light may be removed to make space for the display units. In some such embodiments, light emitters continue to exist in the night-vision systems, but the means of conveying light from the light emitters (and thus conveying indicators) to the user is removed. Thus, methods and systems may be implemented to use the remaining light emitters with new components arranged to convey indicators to the user based on functioning of the light emitters. For example, embodiments may add light detectors to detect light from the remaining light emitters. Additional light emitters may be included and coupled to the light detectors to emit light based on the functioning of the remaining light emitters.

One such method may include attaching a flex circuit to an intensifier module, the flex circuit including one or more light detectors (for detecting light from the remaining light emitters) and extending beyond a leading edge of the intensifier module (e.g., an edge which corresponds to a first part of the intensifier module to enter a housing of a night-vision system, or which corresponds to an input side of the intensifier module). For example, attaching the flex circuit may include attaching the flex circuit along an exterior of the intensifier module. The flex circuit may extend from a trailing edge of the intensifier module.

The method may include inserting the intensifier module into a housing of the night-vision system and folding the flex circuit to expose the one or more light detectors. This positions the light detectors to detect light from light emitters that remain in the housing of the night-vision system. The method may also include optically coupling a display unit to an output side of the intensifier module of the night-vision system. The display unit may be configured to display graphical content in a field of view together with night-vision images from an output of the intensifier module of the night-vision system. In some examples, the display unit may be integrated into the housing of the intensifier module. As noted previously, in some embodiments, light pipes or other devices may be removed to make room for the display unit. Thus, as noted above, the light detectors are coupled to additional light emitters positioned in a location that can be observed by the user even once the display unit has been added. Thus, these additional light emitters are visible to the user, such that light from the remaining light emitters is detected by the added light detectors, which are used to cause the additional light emitters to illuminate, thereby conveying indicators to the user.

The display unit may, in some examples, be powered via the flex circuit. For example, the flex circuit may have thereon one or more power pads which are in contact with batteries or other power-providing components of the night-vision system and which direct power to connectors or pins on the display unit. In some implementations, the flex circuit may also relay one or more indicators from the night-vision system through the display unit. For example, the night-vision system may have a low-battery indicator, a power indicator, an "illuminator on" indicator, etc., which display through an eyepiece of the night-vision system, but which may be blocked or otherwise obstructed if adding updated components. Accordingly, the light detectors may detect light from the internal indicators and cause one or more light output components (e.g., light-emitting diodes (LEDs)) on the display unit to emit light, thereby relaying the indicators.

In some examples, the flex circuit may include a first portion which has thereon the power pads disposed on an outward face of the first portion (e.g., facing radially outward from the intensifier module). The flex circuit may also have a second portion which has the one or more light detectors disposed on an inward face of the second portion (e.g., facing radially inward towards the intensifier module). One or more bridge portions (e.g., having traces or wires) may connect the first portion and the second portion.

In some implementations, folding the flex circuit may include folding the second portion of the flex circuit onto the first portion of the flex circuit and attaching the second portion of the flex circuit to the first portion of the flex circuit using an adhesive material. For example, the second portion may be smaller than the first portion and may have a shape which enables the second portion to fit between the power pads of the first portion. The first portion, the second portion, or both may have a pressure-sensitive adhesive material which enables an adhesive bond if the second portion is folded over onto the first portion (e.g., in between the power pads of the first portion).

In some implementations, additional functionality may be added to the night-vision system. For example, the method may include replacing a flex tail in the night-vision system with a new flex tail which includes GNSS components (e.g., Global Positioning System (GPS) components), wireless communication components, Wi-Fi components, encrypted Wi-Fi components, an inertial measurement unit (IMU), a compass unit, an infrared device, or other such components.

In some examples, the method may include creating additional space inside of the night-vision system by supplying a larger housing, unscrewing an eyepiece, adding a diopter extension element, adding an eyepiece extension element, or physically limiting a number of adjustments that can be made to a diopter, or adding a diopter extension tube.

Various aspects of the present disclosure may be implemented to realize one or more potential advantages. For example, providing methods or techniques for modifying existing night-vision systems may enable adding modern ancillary functionality, such as display units which provide graphical content or additional information to a user. Adding modern ancillary functionality may extend a utility of night-vision systems or reduce upgrade or replacement costs, among other things.

Additional aspects of the present disclosure are described herein with reference to night-vision systems, display units, intensifier modules, and method flows.

FIG. 1 illustrates an example of a night-vision system 100 that supports various aspects of the present disclosure. The night-vision system 100 may include an objective 102, including various optics such as lenses, waveguides, or other optical components for receiving and transmitting light to an intensifier module 104.

For example, a light path 106 illustrates light received at the objective 102 from ambient sources 108. Such ambient sources may include light from heavenly bodies such as stars, the moon, or even faint light from the setting sun. Additionally, or alternatively, the ambient sources 108 may include light from buildings, automobiles, or other faint sources of light that cause reflection of light from an object 110 being viewed in a night-vision environment into the objective 102.

A second source of light is illustrated by the path 112 which shows light emitted from an external source 114 toward the object 110, reflected off the object 110, and into the objective 102. For example, the external source 114 may be an infrared source (e.g., an infrared illuminator flashlight included in the night-vision system 100) not viewable in the visible spectrum for human observers. The night-vision system 100 may be capable of converting the light emitted from the external source 114 into a viewable image for the user.

A third source of light may include light emitted by the object 110. For example, the third source of light may be related to infrared heat energy emitted by the object 110 and directed into the objective 102 as illustrated by a path 116. In some implementations, the third source of light may be used in applications such as short-wave infrared (SWIR), medium-wave infrared (MWIR), or long-wave infrared (LWIR) devices, such as systems having thermal cameras or other devices to create a simplified fusion capability of the night-vision system 100.

The objective 102 may direct any received light into the intensifier module 104, which may include functionality for amplifying light received from the objective 102 to create a sufficiently strong image that is viewable by a user. The intensifier module 104 may accomplish such amplification using various technologies such as a photo cathode, a microchannel plate, and a phosphorous screen. For example, the photo cathode may generate photo electrons in response to incoming photons in the received light.

The night-vision system 100 may include a display unit 118, which may be added to the night-vision system 100 in accordance with aspects of the present disclosure. The display unit 118 may include functionality for displaying information to a user, such as graphical content, including text, images, and the like. In some examples, the graphical unit 118 may be a micro-display capable of displaying one or more lines of text graphics or other information. In some implementations, the micro-display may display content in multiple grayscale shades or in multiple colors.

The night-vision system 100 may also include a beam combiner 120 capable of combining images from the intensifier module 104 and the display unit 118. In some examples, the beam combiner 120 may include optics that are able to display an image from the intensifier 103 and an image from the display unit 118 at a same focal distance (e.g., such that both images are simultaneously in focus for a user).

The night-vision system 100 may include an eyepiece 122, which includes various optics for receiving light from the beam combiner 120 (e.g., which may be received from the intensifier module 104 and the display unit 118). The eyepiece 122 may also include various optics for transmitting light from the beam combiner 120 to an eye of a user. In some examples, the eyepiece 122 may include various hoods and eyepiece fittings to allow for comfortable interface with a user's face and eye. In some implementations, the eyepiece 122 includes a diopter, which may be adjustable to allow a user to adjust focus of the night-vision system 100. In some examples, the diopter adjustment may be configured to not interfere with the beam combiner 120 and potentially the display unit 118.

In some examples, the intensifier module 104 may include a flex circuit 126 which is configured to be an interposer between a power source associated with the night-vision system 100 and the display unit 118. For example, the flex circuit 126 may relay power from a battery of the night-vision system 100 to contact pads or pins which connect to the display unit 118. In some implementations, the flex circuit 126 may also relay signals or indicators to or through the display unit 118. For example, the night-vision system 100 may include an LED 124 (or more multiple LEDs) which function as an indicator (e.g., for battery life, power, etc.). The flex circuit 126 may include light detectors which detect light from the LED 124 and may cause an LED 128 (or multiple LEDs) to turn on, thereby relaying indicators in the night-vision system 100.

In some implementations, the flex circuit 126 may be used in association with a night-vision system which does not include the display unit 118. For example, the flex circuit 126 may be attached to the intensifier module 104 but may not power a display unit 118. Rather, the flex circuit 126 may relay the indicators (e.g., from the LED 124 to the LED 128) without the display unit 118. Such an implementation may allow for removal of a lightpipe, which may enable more thread engagement for a retaining ring associated with the intensifier module 104. Similarly, a flex circuit 126 may allow for customization of the indicators such as using different color LEDs or different arrangements or placement of the LEDs. Implementing aspects of the night-vision system 100 may allow for upgrading existing night-vision systems with ancillary functionality, such as the display unit 118, which may increase a longevity of the night-vision system 100 or may reduce an upgrade or replacement cost.

Figure 2:
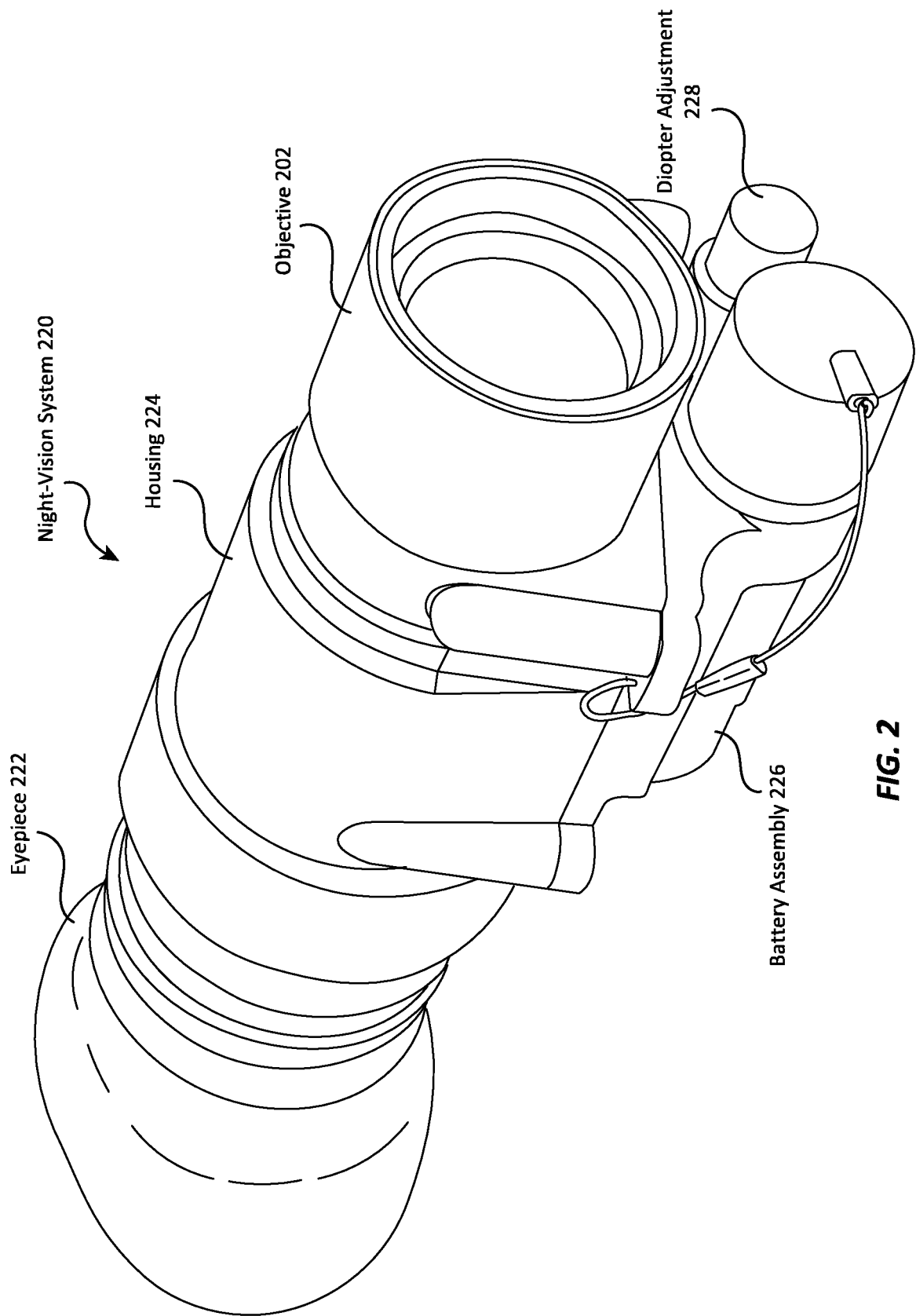
FIG. 2 illustrates an example of a night-vision system.

FIG. 2 illustrates an example of a night-vision system 220 that supports an integrated micro-display module with flex circuitry, in accordance with various aspects of the present disclosure. In some examples, the night-vision system 220 may implement aspects of a night-vision system 100, as described with reference to FIG. 1. In some implementations, the night-vision system 220 may be an example of a PVS-14 night-vision system. The night-vision system 220 may include a housing 224, which may house an intensifier module, flex circuitry, a display unit, and various other components. The night-vision system 220 may also include an objective 202 which may be an example of the objective 102, as described with reference to FIG. 1. The night-vision system 220 may also include an eyepiece 222 which may be an example of an eyepiece 122, as described with reference to FIG. 1. The night-vision system 220 may also include a battery assembly 226, to which modifications may be made to allow for inclusion of a new display unit, flex circuitry, or other circuitry in the night-vision system 220. The night-vision system 220 may also include a diopter adjustment 228. In some examples, the diopter adjustment 228 may be modified to allow for improved focusing, which may enable use of a display unit or an ability to create additional space within the night-vision system 220 (e.g., within the housing 224) to accommodate the display unit. In some implementations, flex circuitry may be used in association with an intensifier module or a display unit to allow the intensifier module or the display unit to fit within the housing 224. Implementing aspects of the night-vision system 220 may allow for upgrading existing night-vision systems with ancillary functionality, such as a display unit, which may increase a longevity of the night-vision system 220 or may reduce an upgrade or replacement cost.

Figure 3:
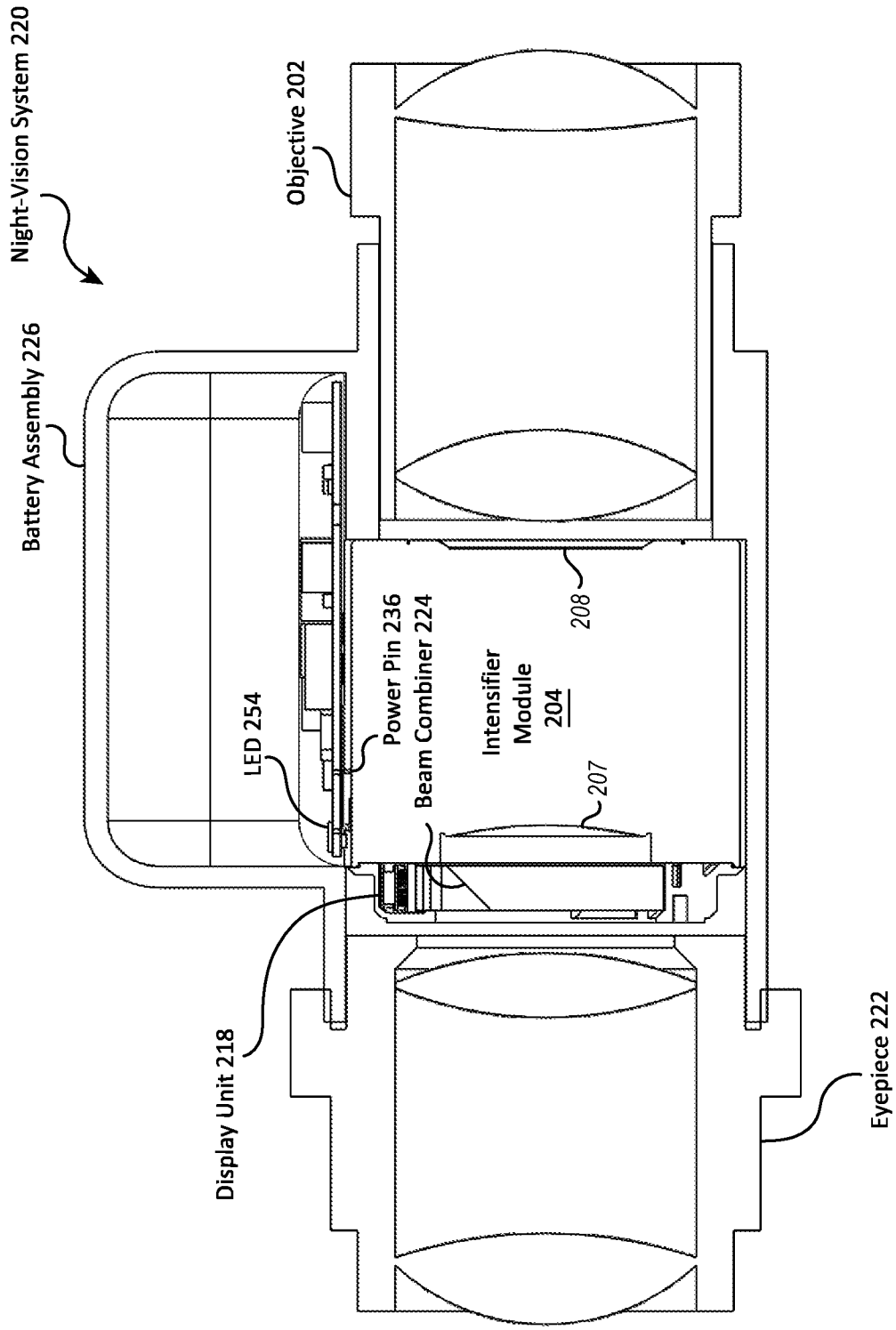
FIG. 3 illustrates an example of a cutaway view of a night-vision system.

FIG. 3 illustrates an example of a cutaway view of a night-vision system 220 (e.g., which may be an example of a night-vision system 220, as described with reference to FIG. 2) that supports an integrated micro-display module with flex circuitry, in accordance with various aspects of the present disclosure. In some examples, the night-vision system 220 may be associated with a night-vision system 100 or 220, as described with reference to FIGS. 1 and 2. For example, various components of the night-vision system 100 or 220 may be viewable only using an internal view. The night-vision system 220 may include an intensifier module 204, which may be an example of an intensifier module 104, as described with reference to FIG. 1. The intensifier module 204 may have an input side 208 where light is received from an environment and an output side 207, where images are displayed to a user after intensification. The night-vision system 220 may also include a display unit 218, which may be an example of a display unit 118, as described with reference to FIG. 1. The night-vision system 220 may also include a beam combiner 224, which may be an example of a beam combiner 120, as described with reference to FIG. 1.

As described herein, functionality of the night-vision system 220 may include receiving light (e.g., infrared light, visible light, etc.) at the objective 202. The intensifier module 204 may receive the light focused from the objective 202 into the intensifier module 204. The intensifier module 204 may amplify the light and output the light to the eyepiece 222. In some examples, the display unit 218 may project various images toward the beam combiner 224, which may combine the images produced by the intensifier module 204 and the display unit 218. The beam combiner 224 may provide the combined image to a user through the eyepiece 222. In some implementations, the night-vision system 220 may include flex circuitry which relays power from the battery assembly 226 to the display unit 218 (e.g., via a power pin 236 in contact with power pads on the flex circuitry). The flex circuitry may, in some examples, be attached to the intensifier module 204 (e.g., using an adhesive material). In some examples, the flex circuitry may include light detectors (e.g., photodiodes, photo detectors, etc.) which may detect various indicators (e.g., from an LED 254) and may relay the indicators to one or more other LEDs on the intensifier module 204 or the display unit 218 and to a user. Implementing aspects of the night-vision system 220 may allow for upgrading existing night-vision systems with ancillary functionality, such as the display unit 218, which may increase a longevity of the night-vision system 220 or may reduce an upgrade or replacement cost.

Figure 4B:
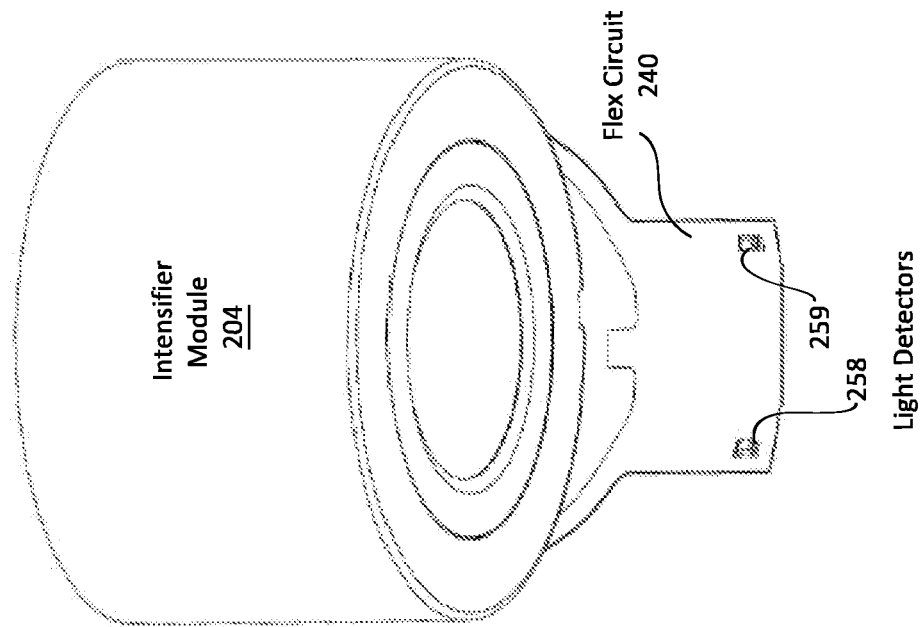
FIGS. 4A and 4B illustrate an example of an intensifier module with an attached flex circuit having light detectors.
Figure 4A:
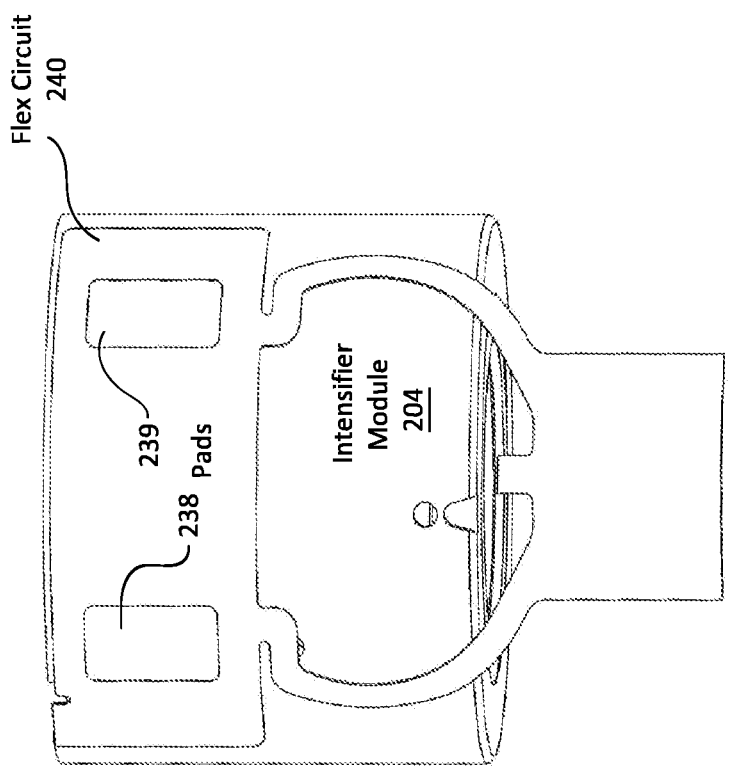

FIGS. 4A and 4B illustrate examples of an intensifier module 204 that supports an integrated micro-display module with flex circuitry, in accordance with various aspects of the present disclosure. In some examples, the intensifier module 204 may be associated with a night-vision system 100 or 220, as described with reference to FIGS. 1-3. The intensifier module 204 may include a flex circuit 240 which may be attached to the intensifier module 204 via an adhesive material. The flex circuit 240 may include a pad 238 and a pad 239 which may be configured to relay power from a power supply unit of a night-vision system. The pad 238 and the pad 239 may be disposed on a portion of the flex circuit 240 which faces radially outward from the intensifier module 204. The flex circuit 240 may also include a light detector 258 and a light detector 259 disposed on a portion of the flex circuit 240 which faces radially inward toward the intensifier module 204. The light detector 258 and the light detector 259 may be configured to detect indicators (e.g., from one or more LEDs of a night-vision system, e.g., LED 254), which the flex circuit 240 may relay to a user using a display unit, additional LEDs, or by other means. Implementing aspects of the intensifier module 204 may allow for upgrading existing night-vision systems with ancillary functionality, such as a display unit, which may increase a longevity of a night-vision system or may reduce an upgrade or replacement cost.

Figure 5:
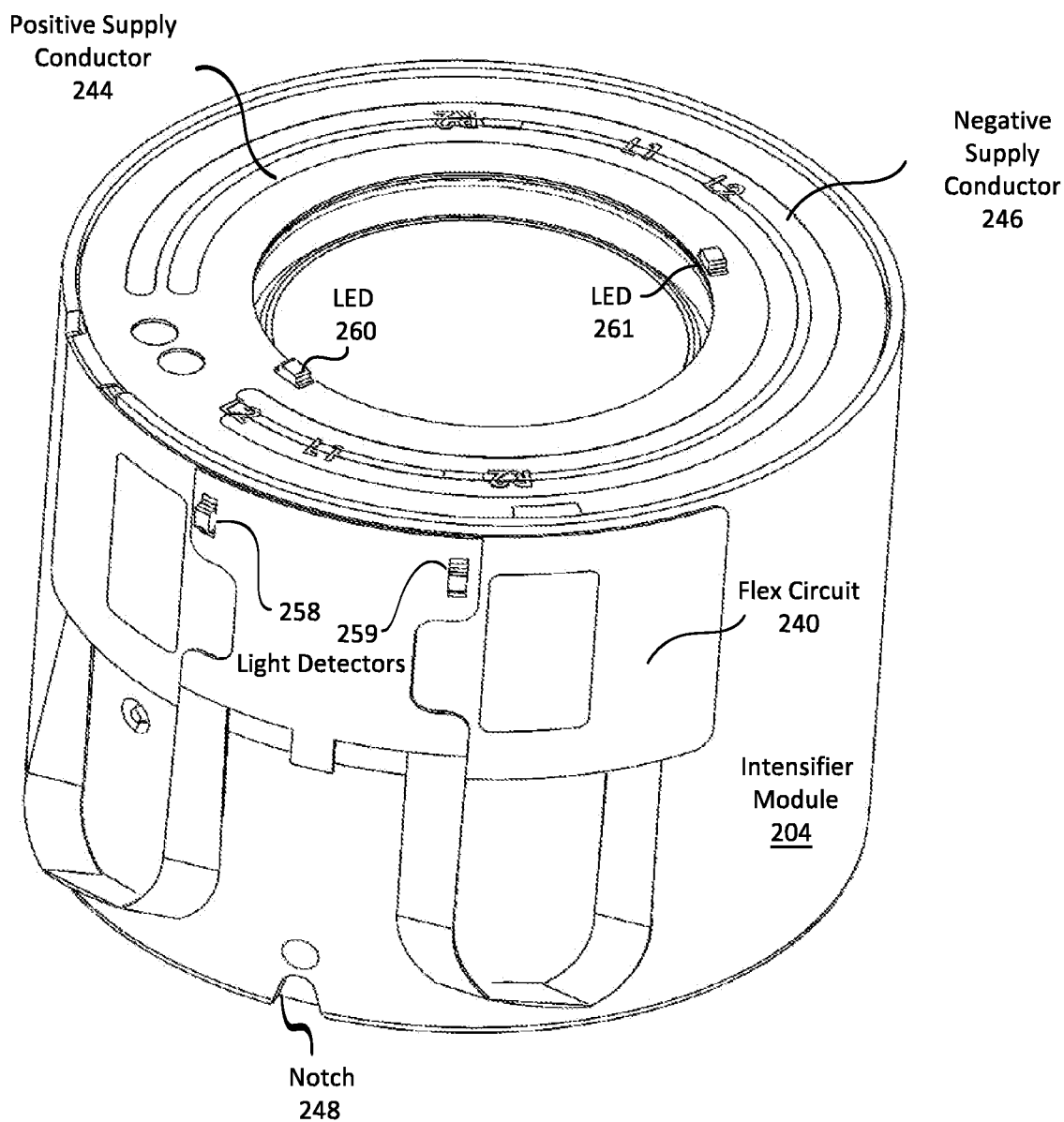
FIG. 5 illustrates an example of an intensifier module with an attached flex circuit having light detectors.

FIG. 5 illustrates an example of an intensifier module 204 that supports an integrated micro-display module with flex circuitry, in accordance with various aspects of the present disclosure. In some examples, the intensifier module 204 may be implemented in association with a night-vision system 100 or 220 or an intensifier module 204, as described with reference to FIGS. 1-4. The intensifier module 204 may include a flex circuit 240, which may be folded over onto itself (e.g., using an adhesive material) to expose the light detector 258 and the light detector 259 (e.g., which may be positioned as described with reference to FIGS. 4A and 4B). The light detector 258 and the light detector 259 may detect indicators form a night-vision system and may relay a signal to an LED 260 and an LED 261. Similarly, the flex circuit 240 may relay power from a power supply of a night-vision system to a positive supply conductor 244 and a negative supply conductor 246. In some examples, the positive supply conductor 244 and the negative supply conductor 246 may be connected to, or otherwise be in contact with, a display unit. In some examples, the intensifier module 204 may include a notch 248 configured to engage with a pin within a housing of a night-vision system to keep the intensifier module 204 in a particular orientation. In some implementations, the intensifier module 204 may include multiple notches to support a number of different orientations. Additionally, or alternatively, to support multiple orientations, the intensifier module 204 or the flex circuit 240 may include multiple power contact pads or large contact pads. Implementing aspects of the intensifier module 204 may allow for upgrading existing night-vision systems with ancillary functionality, such as a display unit, which may increase a longevity of a night-vision system or may reduce an upgrade or replacement cost.

Figure 6:
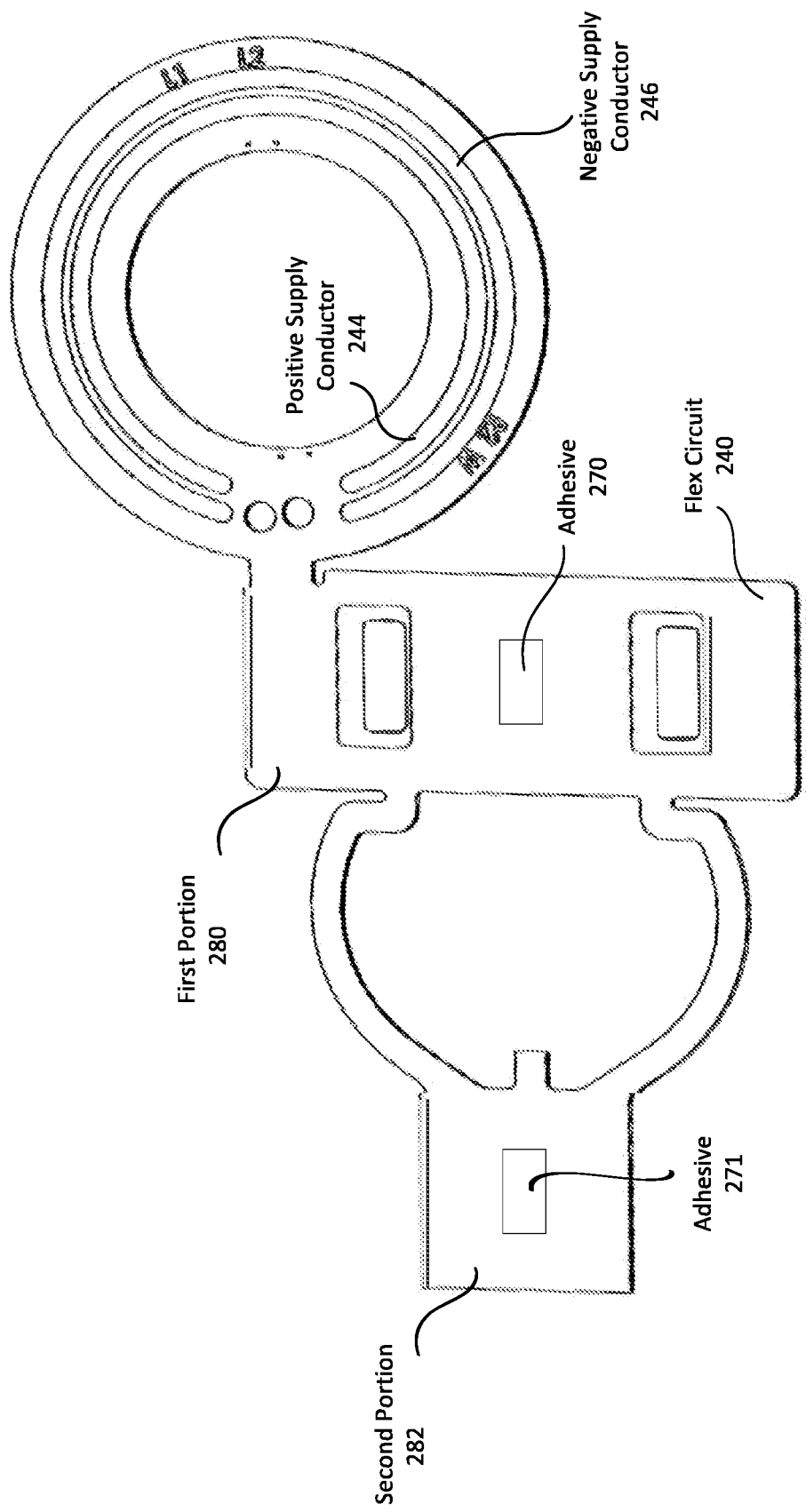
FIG. 6 illustrates an example of a flex circuit.

FIG. 6 illustrates an example of a flex circuit 240 that supports an integrated micro-display module with flex circuitry, in accordance with various aspects of the present disclosure. In some examples, the flex circuit 240 may be implemented in association with night-vision systems, intensifier modules, or related methods, as described with reference to FIGS. 1-5. For example, the flex circuit 240 may be attached or otherwise connected to an intensifier module, as described with reference to FIGS. 1-5. The flex circuit 240 may include a first portion 280 and a second portion 282. The first portion 280 may include one or more power pads which relay power from a power supply of a night-vision system to a positive supply conductor 244 and a negative supply conductor 246 (e.g., which may provide the power to a display unit or other components). In some examples, the first portion 280 may also include an adhesive 270 (e.g., a pressure-sensitive adhesive material) which may adhere to an adhesive material 271 on the second portion 282 if the second portion 282 is folded over onto the first portion 280. In some implementations, the second portion 282 may be smaller than the first portion 280 and may have a shape which enables the second portion 282 to fit between the power pads of the first portion 280 (e.g., if folded over onto the first portion 280). Implementing aspects of the flex circuit 240 may allow for upgrading existing night-vision systems with ancillary functionality, such as a display unit, which may increase a longevity of a night-vision system or may reduce an upgrade or replacement cost.

Figure 7:
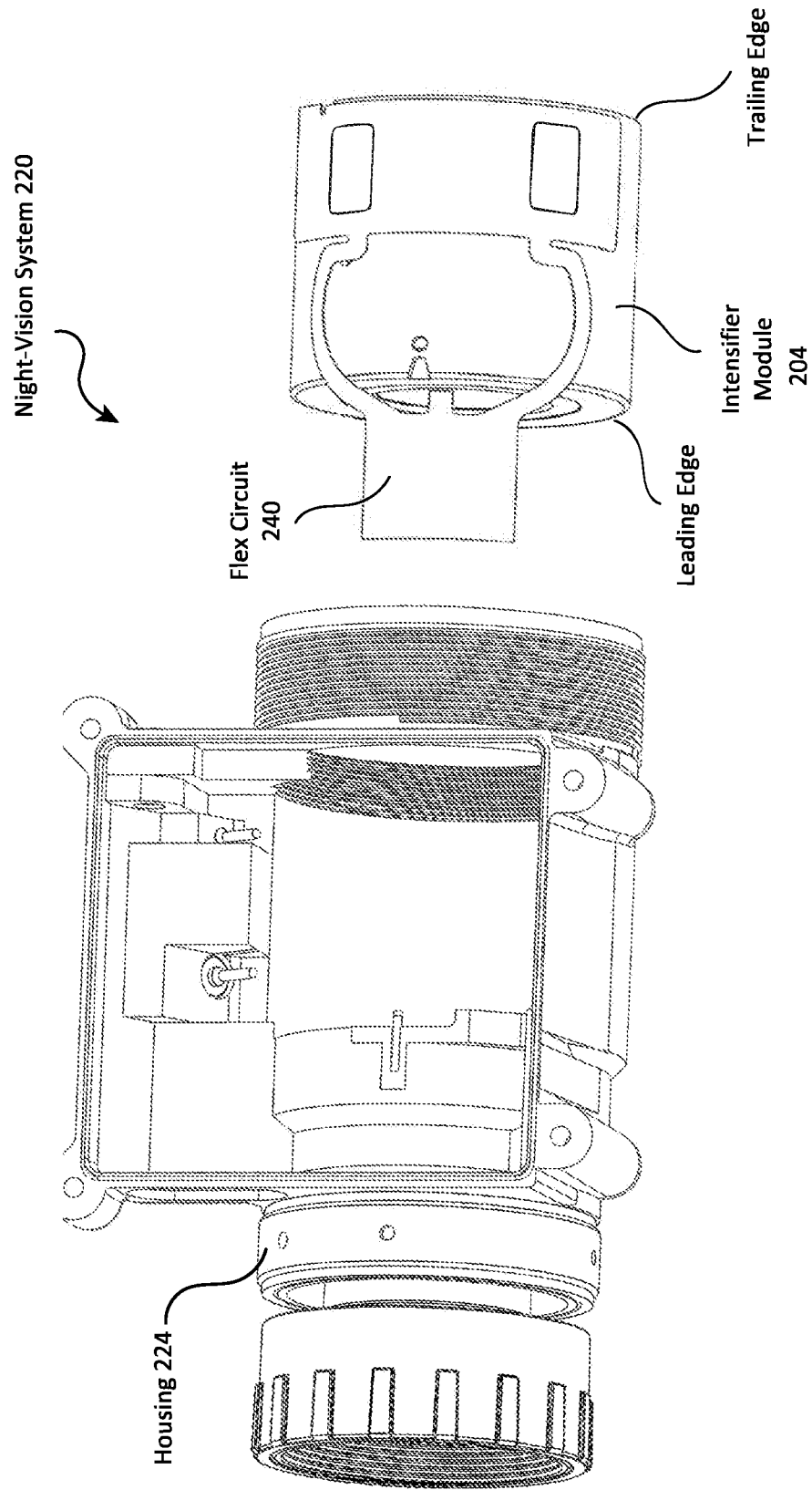
FIGS. 7-9 illustrate examples of installing a flex circuit having light detectors in a night-vision system.

FIG. 7 illustrates an example of a night-vision system 220 that supports an integrated micro-display module with flex circuitry, in accordance with various aspects of the present disclosure. In some examples, the night-vision system 220 may be implemented in association with night-vision systems, intensifier modules, or related methods, as described with reference to FIGS. 1-6. The night-vision system 220 may include a housing 224 and an intensifier module 204. The intensifier module 204 may include an attached flex circuit 240. As illustrated, the flex circuit 240 may extend from a trailing edge of the intensifier module 204 beyond a leading edge of the intensifier module 204. The leading edge of the intensifier module 204 may refer to an edge which enters the housing 224 first if the intensifier module 204 is inserted into the housing 224. In some examples, the flex circuit 240 may enable the intensifier module 204 to be inserted into the housing 224 without adjusting a size of the housing 224 (e.g., if the flex circuit 240 is sufficiently thin to fit within the housing 224 according to existing diameters and tolerances). Implementing aspects of the night-vision system 220 may allow for upgrading existing night-vision systems with ancillary functionality, such as a display unit, which may increase a longevity of the night-vision system 220 or may reduce an upgrade or replacement cost.

Figure 8:
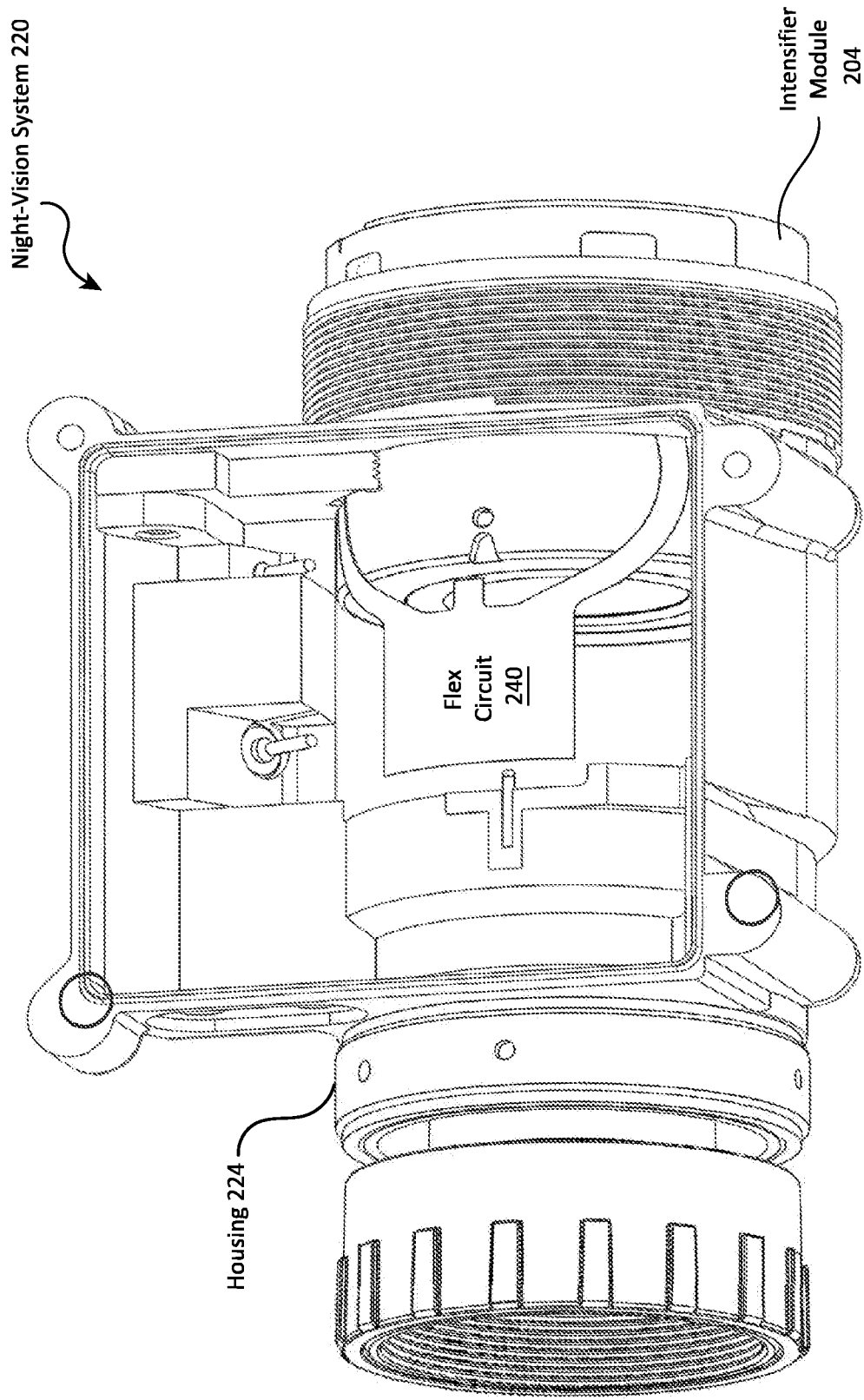
Figure 9:
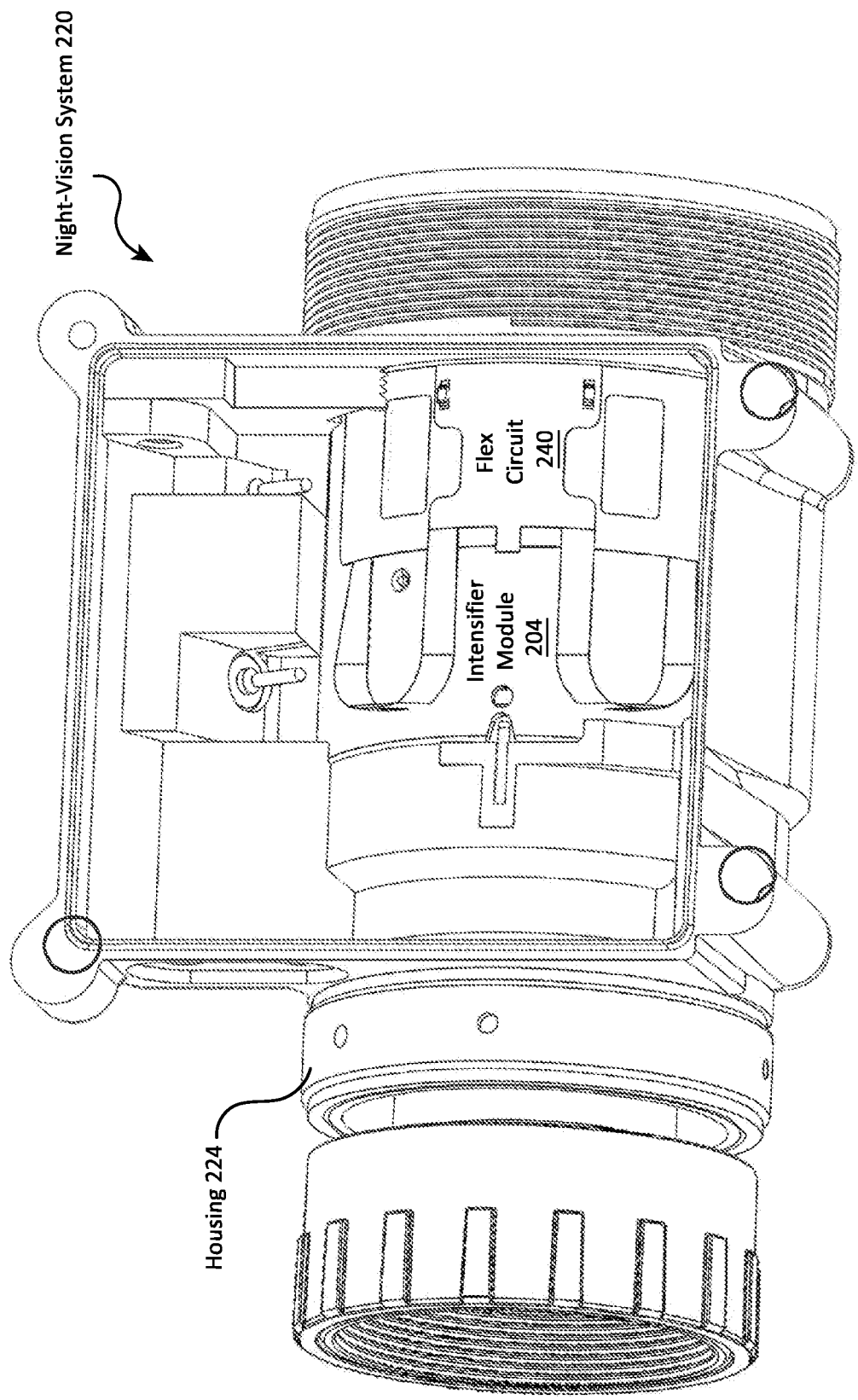

FIGS. 8 and 9 illustrate an example of a night-vision system 220 that supports an integrated micro-display module with flex circuitry, in accordance with various aspects of the present disclosure. In some examples, the night-vision system 220 may be implemented in association with night-vision systems, intensifier modules, or related methods, as described with reference to FIGS. 1-7. The night-vision system 220 may include a housing 224 and an intensifier module 204. The intensifier module 204 may include an attached flex circuit 240. As illustrated with respect to FIG. 8, the intensifier module 204 may be inserted into the housing 224 with the flex circuit 240 extended. If the intensifier module 204 is inserted completely into the housing 224, the flex circuit 240 may be folded back onto itself, as illustrated with respect to FIG. 9, to expose one or more light detectors. In this way, the light detectors may be included in the night-vision system 220 without modifying a size or diameter of the housing 224. Implementing aspects of the night-vision system 220 may allow for upgrading existing night-vision systems with ancillary functionality, such as a display unit, which may increase a longevity of the night-vision system 220 or may reduce an upgrade or replacement cost.

Figure 10:
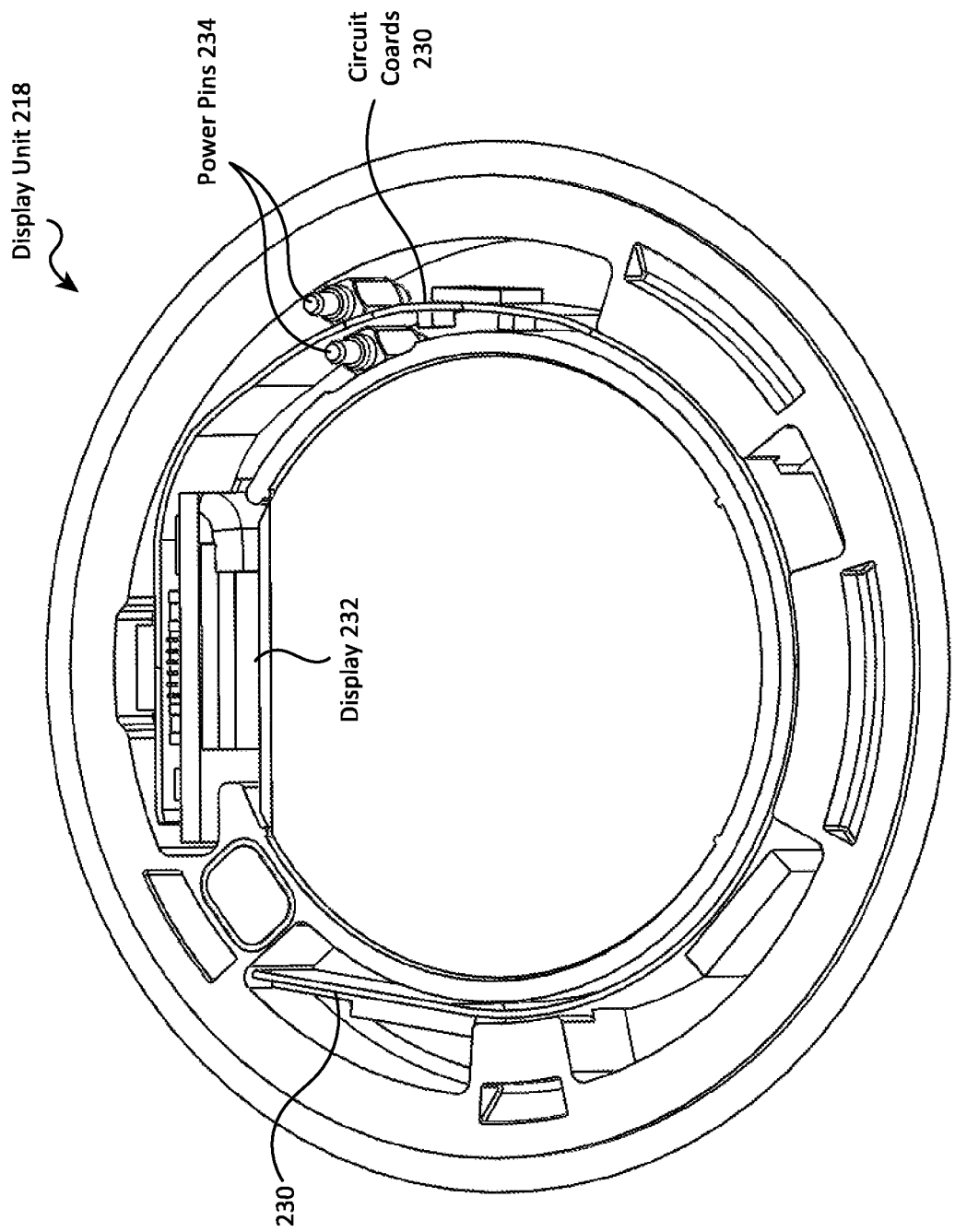
FIG. 10 illustrates an example of a display unit for use in a night-vision system.

FIG. 10 illustrates an example of a display unit 218 that supports an integrated micro-display module with flex circuitry, in accordance with various aspects of the present disclosure. In some examples, the display unit 218 may be implemented in association with night-vision systems, intensifier modules, or related methods, as described with reference to FIGS. 1-9. The display unit 218 may include various circuit boards 230, which may include various circuitry to drive or otherwise control a display 232.

The display unit 218 may be designed to be as short as practicable to fit within a night-vision system without limiting a diopter adjustment. In some implementations, a diopter extending element may be added to an eyepiece assembly to allow more space. Additionally, or alternatively, the diopter adjustment may be limited. In some examples, a night-vision system may implement an extension adapter which screws on to a system housing and which may provide additional length along an optical axis of the night-vision system. Similarly, a new eyepiece design may be implemented and attached to the extension adapter which may compensate for an increased focal length. In some embodiments, space may be made for the display unit 218 by removing other existing components, such as light pipes used to transmit signals form LEDs. As noted previously, the signals can nonetheless be transmitted by using light detectors and additional LEDs (or the display 232 itself).

In some implementations, the display 232 may be capable to display multiple lines of text or graphics at multiple grayscale shades or multi-color. In some examples, the display 232 may be an organic LED (OLED) micro-display, which is approximate 4.5 mm along a diagonal axis.

The display unit 218 may be self-contained such that all image generation or processing chips are present on the circuit boards 230. In some examples, the circuit boards 230 may also include power conversion circuitry (e.g., to convert power received via a flex circuit in connection with the display unit 218).

In some examples, the circuit boards 230 may also include one or more of an IMU or similar sensor, an accelerometer designed to detect impacts, a compass unit, or wireless communications components. In some implementations, the circuit boards 230 or included components may be integrated within an existing image intensifier module power supply board.

Additionally, or alternatively, other components may be implemented, such as GPS, Wi-Fi, encrypted Wi-Fi chipsets, etc. In some examples, due to size constraints or thresholds, such components may be implemented by replacing a battery assembly or power supply of a night-vision system. In some examples, replacing the battery assembly may include replacing the battery assembly with a larger battery assembly to allow for additional components (e.g., various infrared devices, such as SWIR, MWIR, and/or LWIR devices, such as thermal cameras or other devices to create a simplified fusion capability). In some implementations, some or all such components may be implemented on a flex tail, which may replace an existing flex tail of a night-vision system.

In some examples, the display unit 218 may include power pins 234, which are coupled to the circuit boards 230. The power pins 234 may provide a conductive means for applying power to the circuit boards 230 and the display 232. In some examples, power transfer to the display unit 218 may be accomplished by pogo pins which press down on electrical pads or bent metal finger-style contacts which may press down on electrical pads, implemented as a positive supply conductor and a negative supply conductor in a concentrically arcing arrangement (e.g., as illustrated with respect to FIG. 6 in association with a flex circuit). Concentric conductors may allow the display unit 218 to be used in various different orientations with respect to an intensifier module (e.g., to maintain an orientation of graphical content with respect to a user). Implementing aspects of the display unit 218 may allow for upgrading existing night-vision systems with ancillary functionality, such as the display unit 218, which may increase a longevity of the night-vision systems or may reduce an upgrade or replacement cost.

Figure 11:
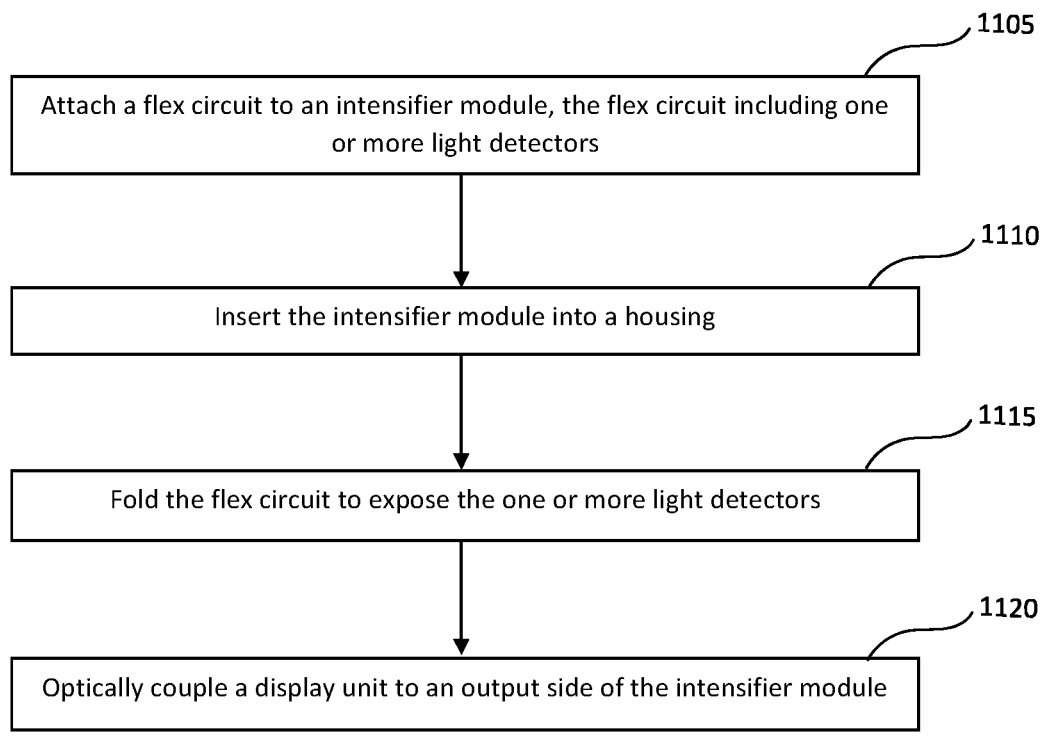
FIGS. 11 and 12 illustrate examples of method flows that support upgrading and using a night-vision system, in accordance with aspects of the present disclosure.

FIG. 11 illustrates an example of a method flow 1100 that supports techniques for using a modified night-vision system, in accordance with aspects of the present disclosure. In some examples, the method flow 1100 may illustrate a method which may be implemented in association with a night-vision systems or related methods as described with reference to FIGS. 1-10. Aspects of the method flow 1100 may be performed in a different order than illustrated or aspects may be added or removed.

At 1105, the method may include attaching a flex circuit to an intensifier module, the flex circuit including one or more light detectors and extending beyond a leading edge of the intensifier module. In some examples, attaching the flex circuit may include attaching the flex circuit along an exterior of the intensifier module, the flex circuit extending from a trailing edge of the intensifier module and beyond the leading edge of the intensifier module, in which the one or more light detectors are located on a portion of the flex circuit beyond the leading edge of the intensifier module. In some examples, the flex circuit may include a first portion having one or more power pads disposed on an outward face of the first portion, a second portion having the one or more light detectors disposed on an inward face of the second portion, and one or more bridge portions configured to connect the first portion and the second portion. In some implementations, the second portion may have a shape which enables the second portion to be placed in a location relative to the first portion such that the one or more light detectors of the second portion are located above, below, between, outside of, or on top of the one or more power pads of the first portion.

At 1110, the method includes inserting the intensifier module into a housing of the night-vision system.

At 1115, the method includes folding the flex circuit to expose the one or more light detectors. In some implementations, folding the flex circuit may include folding the second portion of the flex circuit onto the first portion of the flex circuit and attaching the second portion of the flex circuit to the first portion of the flex circuit using an adhesive material.

At 1120, the method includes optically coupling a display unit to an output side of the intensifier module of the night-vision system, the display unit configured to display graphical content in a field of view together with night-vision images from an output of the intensifier module of the night-vision system. In some implementations, the method may include integrating the display unit into a housing of the intensifier module. In some implementations, the method may include electrically coupling the one or more power pads on first portion of the flex circuit attached to the intensifier module to power inputs for the display unit.

In some implementations, the method may include replacing a flex tail in the night-vision system with a new flex tail including at least one of GPS components, wireless communication components, Wi-Fi components, encrypted Wi-Fi components, an inertia measurement unit (IMU), a compass unit, or an infrared device. In some examples, the method may include creating additional space inside of the night-vision system by performing at least one of supplying a larger housing, unscrewing of an eyepiece, adding a diopter extension element, adding an eyepiece extension element, physically limiting a number of adjustments that can be made to a diopter, or adding a diopter extension tube. Implementing aspects of the method flow 1100 may enable upgrading existing night-vision systems with modern or updated functionality, such as the display unit.

Figure 12:
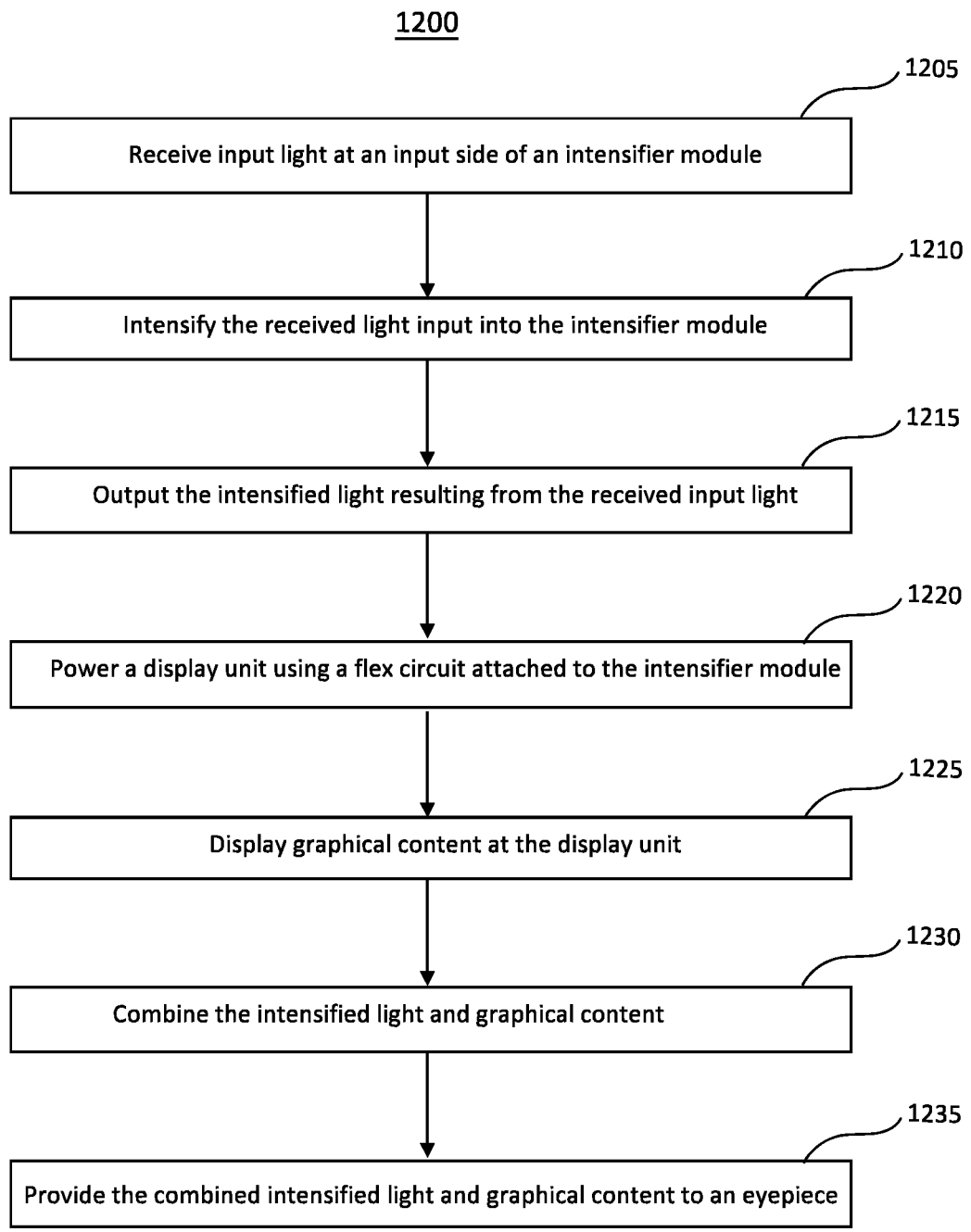

FIG. 12 illustrates an example of a method flow 1200 that supports techniques for using a modified night-vision system, in accordance with aspects of the present disclosure. In some examples, the method flow 1200 may be implemented in association with a night-vision systems or related methods as described with reference to FIGS. 1-11. Aspects of the method flow 1200 may be performed in a different order than illustrated or aspects may be added or removed.

At 1205, the method includes receiving input light at an input side of an intensifier module.

At 1210, the method includes intensifying the received light input into the intensifier module.

At 1215, the method includes outputting, at an output side of the intensifier module, the intensified light resulting from the received input light.

At 1220, the method includes powering a display unit using a flex circuit attached to the intensifier module.

At 1225, the method includes displaying graphical content at the display unit proximate the output side of the intensifier module, the graphical content including one or more indicators routed via the flex circuit, the display unit being added to the modified night-vision system that has been modified to allow of the display unit to be added. In some examples, the one or more indicators may include a low battery indicator or an infrared power indicator, or both.

At 1230, the method may include combining the intensified light and graphical content.

At 1235, the method may include providing the combined intensified light and graphical content to an eyepiece to provide the combined intensified light and graphical content to a user. Implementing aspects of the method flow 1200 may enable the use of night-vision systems which have been modified to include modern or updated ancillary functions, such as a display unit.

The present invention may include other specific forms without departing from its characteristics. The described examples are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method of upgrading a night-vision system, the method comprising
   attaching a flex circuit to an intensifier module, the flex circuit comprising one or more light detectors and extending beyond a leading edge of the intensifier module;
   inserting the intensifier module into a housing of the night-vision system;
   folding the flex circuit to expose the one or more light detectors; and
   optically coupling a display unit to an output side of the intensifier module of the night-vision system, the display unit configured to display graphical content in a field of view together with night-vision images from an output of the intensifier module of the night-vision system.

2. The method of claim 1 wherein the flex circuit further comprises:
   a first portion having one or more power pads disposed on an outward face of the first portion;
   a second portion having the one or more light detectors disposed on an inward face of the second portion; and
   one or more bridge portions configured to connect the first portion and the second portion.

3. The method of claim 2, wherein folding the flex circuit further comprises:
   folding the second portion of the flex circuit onto the first portion of the flex circuit; and
   attaching the second portion of the flex circuit to the first portion of the flex circuit using an adhesive material.

4. The method of claim 2, wherein the second portion has a shape which enables the second portion to be placed in a location relative to the first portion such that the one or more light detectors of the second portion are located above, below, between, outside of, or on top of the one or more power pads of the first portion.

5. The method of claim 2, further comprising electrically coupling the one or more power pads on first portion of the flex circuit attached to the intensifier module to power inputs for the display unit.

6. The method of claim 1, wherein attaching the flex circuit further comprises:
   attaching the flex circuit along an exterior of the intensifier module, the flex circuit extending from a trailing edge of the intensifier module and beyond the leading edge of the intensifier module, wherein the one or more light detectors are located on a portion of the flex circuit beyond the leading edge of the intensifier module.

7. The method of claim 1, further comprising replacing a flex tail in the night-vision system with a new flex tail including at least one of GPS components, wireless communication components, Wi-Fi components, encrypted Wi-Fi components, an inertial measurement unit (IMU), a compass unit, or an infrared device.

8. The method of claim 1, further comprising creating additional space inside of the night-vision system by performing at least one of supplying a larger housing, unscrewing of an eyepiece, adding a diopter extension element, adding an eyepiece extension element, physically limiting a number of adjustments that can be made to a diopter, or adding a diopter extension tube.

9. The method of claim 1, further comprising integrating the display unit into a housing of the intensifier module.

10. A modified night-vision system comprising:
    an intensifier module configured to intensify received light input into the intensifier module, the intensifier module having an input side configured to receive photons of the received light and an output side configured to output intensified light resulting from the received light;
    a flex circuit attached to the intensifier module, the flex circuit comprising one or more light detectors and extending beyond a leading edge of the intensifier module;
    a display unit proximate the output side of the intensifier module, the display unit configured to output graphical content;
    a beam combiner optically coupled to the display unit and the output side of the intensifier module and configured to combine the intensified light and graphical content;
    an eyepiece optically coupled to the beam combiner, and configured to receive the combined intensified light and graphical content and to provide the combined intensified light and graphical content to a user;
    wherein the night-vision system is modified to allow for the display unit and beam combiner to be added to the night-vision system.

11. The night-vision system of claim 10, wherein the flex circuit further comprises:
    a first portion having one or more power pads disposed on an outward face of the first portion, the one or more power pads configured to provide power to the display unit;
    a second portion having the one or more light detectors disposed on an inward face of the second portion; and one or more bridge portions configured to connect the first portion and the second portion.

12. The night-vision system of claim 11, wherein the second portion has a shape which enables the second portion to be placed in a location relative to the first portion such that the one or more light detectors of the second portion are located above, below, between, outside of, or on top of the one or more power pads of the first portion.

13. The night-vision system of claim 11, wherein the first portion or the second portion, or both, include an adhesive material.

14. The night-vision system of claim 10, wherein the flex circuit is attached along an exterior of the intensifier module, the flex circuit extending from a trailing edge of the intensifier module and beyond the leading edge of the intensifier module, wherein the one or more light detectors are located on a portion of the flex circuit beyond the leading edge of the intensifier module.

15. The night-vision system of claim 10, wherein the intensifier module comprises at least one electrical pad configured in size and shape to allow the intensifier module to be implemented in the night-vision system in a plurality of orientations.

16. The night-vision system of claim 10, wherein the one or more light detectors are configured to detect one or more indicator lights internal to the night-vision system, the night-vision system further comprising:
a light source configured to transmit light to the user at the eyepiece when the one or more light detectors detects the one or more indicator lights.

17. The night-vision system of claim 10, further comprising an inertial measurement sensor used to detect and orientation of the night-vision system, wherein the orientation of the night-vision system is used to determine an orientation for the graphical content.

18. The night-vision system of claim 10, further comprising an accelerometer configured to detect impacts to the night-vision system, wherein the impacts can be used to control the graphical content.

19. A method of using a modified night-vision system, the method comprising:
receiving input light at an input side of an intensifier module;
intensifying the received light input into the intensifier module;
outputting, at an output side of the intensifier module, the intensified light resulting from the received input light;
powering a display unit using a flex circuit attached to the intensifier module;
displaying graphical content at the display unit proximate the output side of the intensifier module, the graphical content comprising one or more indicators routed via the flex circuit, the display unit being added to the modified night-vision system that has been modified to allow of the display unit to be added;
combining the intensified light and graphical content; and
providing the combined intensified light and graphical content to an eyepiece to provide the combined intensified light and graphical content to a user.

20. The method of claim 19, wherein the one or more indicators comprise a low battery indicator or an infrared power indicator, or both.

* * * * *